US006862620B2

(12) United States Patent
Ullmann et al.

(10) Patent No.: US 6,862,620 B2
(45) Date of Patent: Mar. 1, 2005

(54) WEB PAGE MONITORING SYSTEM AND METHODS THEREFOR

(75) Inventors: Cristi Nesbitt Ullmann, Austin, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 09/875,866

(22) Filed: Jun. 7, 2001

(65) Prior Publication Data

US 2002/0188696 A1 Dec. 12, 2002

(51) Int. Cl.[7] ........................ G06F 15/173; G06F 15/16; G06F 17/40

(52) U.S. Cl. ........................ 709/224; 709/203; 345/736

(58) Field of Search ................................ 709/224, 203; 345/736

(56) References Cited

U.S. PATENT DOCUMENTS

| | | | | |
|---|---|---|---|---|
| 6,098,093 A | | 8/2000 | Bayeh et al. | 709/203 |
| 6,112,240 A | * | 8/2000 | Pogue et al. | 709/224 |
| 6,121,970 A | | 9/2000 | Guedalia | 345/357 |
| 6,366,298 B1 | * | 4/2002 | Haitsuka et al. | 345/736 |
| 6,631,512 B1 | * | 10/2003 | Onyeabor | 717/100 |
| 2002/0087679 A1 | * | 7/2002 | Pulley et al. | 709/224 |
| 2002/0138624 A1 | * | 9/2002 | Esenther | 709/227 |
| 2002/0165954 A1 | * | 11/2002 | Eshghi et al. | 709/224 |
| 2002/0174174 A1 | * | 11/2002 | Ramraj et al. | 709/203 |
| 2002/0198939 A1 | * | 12/2002 | Lee et al. | 709/203 |

OTHER PUBLICATIONS

Bradford, Annette. "Tivoli Kernel Services," *Distribution and Planning Guide*, Jun. 8, 2000, pp. 1–126.
Richmond, Alan. "Dynamic HTML," via Internet at http://www.wdvl.com/Authoring/ DHTML/, pp. 1–4.

"Why Are We Building TMOS?" pp. 1–5.

Carnes, Ray. "JSP: The Short Course," *JSP Insider*, Aug. 26, 2000, pp. 1–6.

Sun Microsystems, Inc. "Powering the Web Experience with Dynamic Content," *JavaServer Pages™ Technology*, Nov. 1999, pp. 1–10.

"Techencyclopedia," (Results found for: middleware) via Internet at http://www.techweb.com/encyclopedia/defineterm?term=middleware, pp. 1–7.

"Techencyclopedia," (Results found for: J2EE) via Internet at http://www.techweb.com/encyclopedia/defineterm?term=J%32EE, pp. 1–4.

"Techencyclopedia," (Results found for: dynamic HTML) via Internet at http://www.techweb.com/encyclopedia/defineterm?term=Dynamic% 20HTML, pp. 1–2.

"Techencyclopedia," (Results found for JSP) via Internet at http://www.techweb.com/encyclopedia/defineterm?term=JSP, pp. 1–3.

* cited by examiner

*Primary Examiner*—Krisna Lim
(74) *Attorney, Agent, or Firm*—Kelly K. Kordzik; Leslie Van Leeuwen

(57) ABSTRACT

A system and process for monitoring web pages are implemented. The web page includes at least a portion dynamically generated in response to client data. A set of hooks, constituting alternative entries in methods for performing actions on the client data are listed, in which the hooks correspond to at least a portion of the client data. The client data is passed to the corresponding methods using the hooks, and wherein a web page is not returned to a client in response to the passing the client data.

30 Claims, 5 Drawing Sheets

TO NETWORK 115, FIG. 1
300

305
111
PAGE SERVER
STATE COMPONENT MARKUP
307
MARKUP LANGUAGE GENERATOR
309
304
PAGE MONITORING SERVICE
CONFIGURATION
310
HOOK MANAGER INTERFACE
308
BACKEND DATABASE
130
311
HOOK MANAGER SERVICE
306
DATA HOOK NAMES
312
TEST CASE ENGINE
314
ERROR LOG/ ADMIN. DISPLAY
302
OS SERVICE MANAGER
303

WEB PAGE MONITORING SYSTEM AND METHODS THEREFOR

TECHNICAL FIELD

The present invention relates to the field of information systems, and more particularly to web based resource transactions mediated via dynamic web pages.

BACKGROUND INFORMATION

The development of computerized distribution information systems, such as the Internet, allows users to link with servers and networks, and thus retrieve vast amounts of electronic information that was previously unavailable using conventional electronic mediums. Such electronic information increasingly is replacing the more conventional means of information such as newspapers, magazines and television.

Users may be linked to the Internet through a protocol commonly referred to as the World Wide Web (WWW). With the World Wide Web, an entity having a domain name may create a "web page" or "page" that can provide information and to a limited degree some interactivity.

A computer user may "browse", i.e., navigate around, the WWW by utilizing a suitable web browser, e.g., Netscape™, Internet Explorer™, and a network gateway, e.g., Internet Service Provider (ISP). A web browser allows the user to specify or search for a web page on the WWW and subsequently retrieve and display web pages on the user's computer screen. Such web browsers are typically installed on personal computers or workstations to provide web client services, but increasingly may be found on wireless devices such as cell phones.

The Internet is based upon a suite of communication protocols known as Transmission Control Protocol/Internet Protocol (TCP/IP) which sends packets of data between a host machine, e.g., server computer on the Internet commonly referred to as web server, and a client machine, e.g., a user's computer connected to the Internet. The WWW is an Internet interface protocol which is supported by the same TCP/IP transmission protocol.

A web page may typically include presentation components, e.g., navigational menus, pop-up windows/menus, charts, graphs, of visual images (static and dynamic), video and/or text. Static images, video and/or text may be specified in various languages or protocols such as Hyper-Text Mark-up Language (HTML), Extensible Hyper-Text Mark-up Language (XHTML), Dynamic Hyper-Text Mark-up Language (DHTML), JavaScript, Cascading Style Sheets (CSS), Scalable Vector Graphics (SVG), Document Object Model (DOM), Extensible Stylesheet Language (XSL), Extensible Mark-up Language (XML) and Synchronized Multimedia Integration Language (SMIL).

For example, images, video and/or text may be specified in a HTML file that is sent from the web server to the client machine. (Web client is typically used to refer to the software on a data processing system that receives and processes web pages to render them perceivable by a human user of the system. For simplicity of nomenclature, for the present purpose, web client will be used herein to interchangeably refer to the software and the human user of the system on which the client software is deployed.) The HTML file may then be parsed by the web browser in order to display the text and images on the display of the client machine. Additional functionality may be provided in web pages with information downloaded over the WWW in the form of scripts. Scripting, typically in the form of JavaScript, allows a series of instructions to be performed on the client computer once the instructions have been downloaded in a web page. Further functionality may be provided in web pages by dynamic web pages. Dynamic pages include information that may change because the information content therein changes over time, or because the information is specific to the particular web client. Examples of the former may include weather forecast information conveyed in a web page, or stock ticker information provided to a web client. Examples of the latter may include "on-line" account information related to the web client such as information associated with the client's account at a financial institution, securities brokerage account, or an account with an e-commerce retailer.

Dynamic web pages may be implemented using a multiplicity of technologies. One such is Dynamic Hypertext Markup Language (DHTML), which is a set of features currently incorporated in browsers, e.g., Internet Explorer™ and Netscape Navigator™ that enables software developers to dynamically change the rendering and content of an HTML document. Using DHTML, a software developer may access attributes of a document's contents or objects, e.g., access object's position on the page and type. Another technology is Java Server Pages (JSP). JSPs typically include HTML to render static portions of the web page with embedded Java code to implement dynamic parts of the page, which may also render portions of the page that are generated by actions on dynamic data in accordance with the transaction requested by the web client.

The dynamic data used in generating the page may be derived from a multiplicity of sources. The data may be retrieved from a database entry in a database in which the entry corresponds to information related to the web client. The data stored in the database may have been previously supplied by the client. Or the data may have been provided by the client in the web page request. Additionally, the data used to generate the page may be a combination of both.

The data may be subject to errors introduced from several sources. Hardware errors in the database may corrupt the data. The web client may make entry errors, and network errors may corrupt web client supplied data during transmission to the server. Additionally, the database may be managed by a database management system (DBMS). Software errors introduced in the database management system (DBMS) may also produce errors in the data in the database.

If the dynamic data is corrupted, a web page error may result when the server generates the page. For example, the methods performing actions on the data to generate the page may expect data within particular ranges, or in particular formats, and the corrupted data will result in a runtime error when the server attempts to generate the page, resulting in an error message displayed on the web client's system. Consequently, there is a need in the art for monitoring the generation of dynamic web pages to detect generation errors due to corrupted data.

SUMMARY

The aforementioned needs are addressed by the present invention. Accordingly there is provided a process for monitoring web pages. The web page includes at least one portion dynamically generated in response to client data. The process includes selectively interrogating a web page in response to a preselected mode. Selectively interrogating the web page includes listing a set of hooks corresponding to at least a portion of the client data, in which each hook of the set of hooks constitutes an alternative entry of a method for performing an action on the client data. The process of interrogating the web page further includes passing the at least a portion of the client data to corresponding methods using hooks in the set of hooks, and wherein a web page is not returned to a client in response to the passing of the client data.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth such as specific graphical data to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Figure 1:
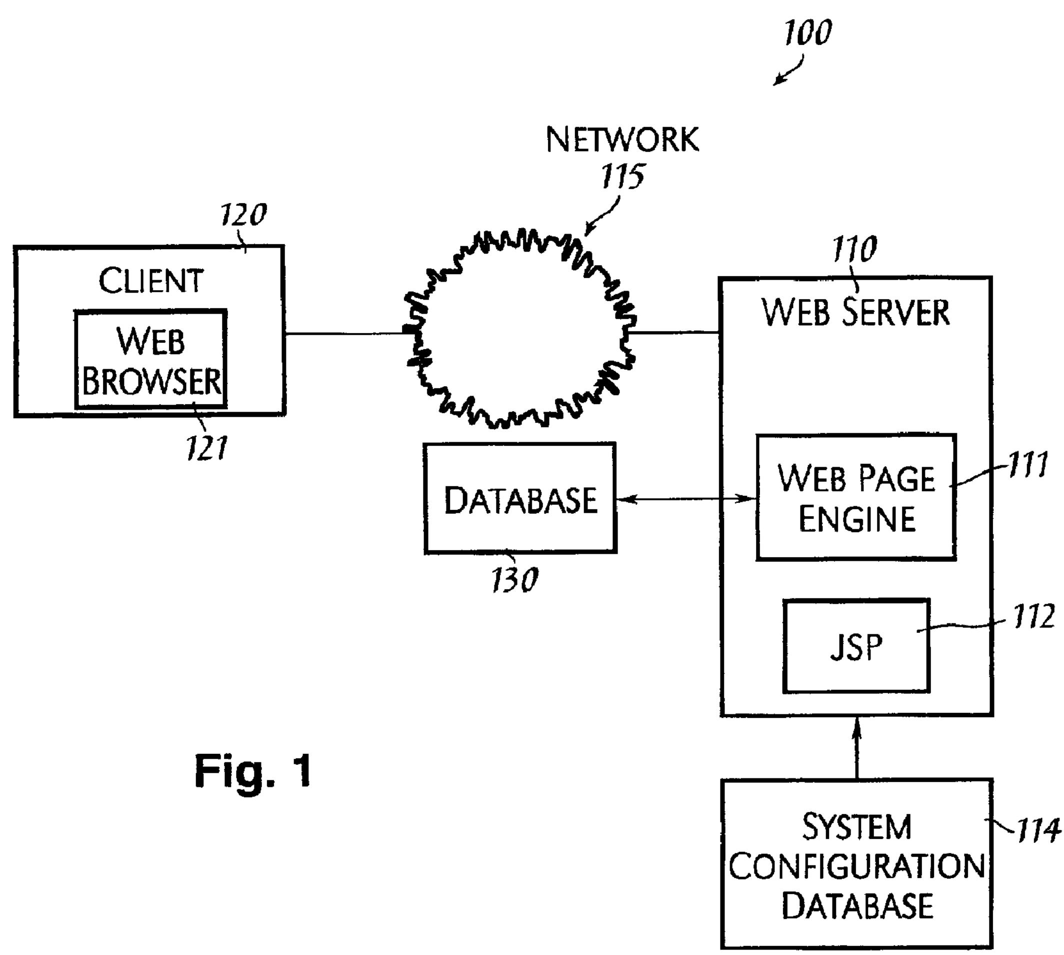
FIG. 1 illustrates a web based resource distribution system configured in accordance with the present invention.

Refer now to FIG. 1 which illustrates an embodiment of the present invention of a web based resource system 100. Resource system 100 includes a web server 110 connected to a client 120. Client 120 and web server 110 may be coupled for bi-directional communication via a network path, generally indicated by 115, which in practice may be implemented by one or more wireless or wired network links having associated bandwidths or data rates. In one embodiment, client 120 may be connected to web server 100 through the Internet. The Internet may refer to a network of computers. In one embodiment, client 120 may be connected to web server 110 through an Intranet. Intranets are internal information networks which are based on Internet standards and protocols. In other embodiments, network path 115 may be any global open network or even a local or wide area network within an organization. It is noted that resource system 100 may comprise a plurality of clients 120 connected to web server 110 and that FIG. 1 is illustrative.

Client 120 may include a web browser 121 which may be configured for communicating with the Intranet or Internet and for requesting web pages from a server, such as server 110. As previously discussed, a web page may be generated dynamically, that is contain dynamic data which is incorporated in or otherwise affects the content of the web page to be sent to the requesting client, such as client 120. Also as discussed hereinabove, a dynamically generated web page may be implemented using a multiplicity of technologies including Java Server Pages (JSP) in which dynamic elements of the web page may be generated using methods written in the Java object-oriented programming language. In this way, web server 110 may perform actions on data corresponding to the requesting web client, in which the JSP implements code to perform a particular task on the data. For example, a task may be to retrieve information from a database and return information processed therefrom to the requesting web client. Another example might be retrieving information from a database entry corresponding to the requesting client's securities brokerage account and returning to the client a confirmation of a particular transaction, such as a purchase or sale of stock shares. In general, most transactions in electronic commerce (e-commerce) would similarly implicate dynamically generated web pages. The database entry may be contained in a database, such as database 130, coupled to the server, such as web server 110. Note, however, as would be recognized by those of ordinary skill in the art, database 130 may itself be implemented in a distributed fashion, and need not be local to server 10. Moreover, it would be understood by these artisans that communication between database 130 and web server 110 intermediated by a database server (which has not been shown in FIG. 1 so as to not unnecessarily complicate the drawing).

Web server 110 may include a web page engine 111 for maintaining and providing access to an Intranet or Internet web page which is enabled to forward JSP 112 to web browser 121 of client 120. A user may select a particular service which corresponds to one of the JSP 112, thereby causing web browser 121 of client 120 to initiate execution of the corresponding JSP 112. Additionally web page engine 111 includes page monitoring services in accordance with the principles of the present invention. Web server configuration information may be included in system configuration database 114. Such configuration information will be discussed hereinbelow. (Communication between system configuration database 114 and web server 110 may be intermediated by a database server, not shown in FIG. 1, for simplicity.) Portions of web server 110 will be discussed in further detail in conjunction with FIGS. 3–5, however first consider a typical hardware configuration which may be used with server 110.

Figure 2:
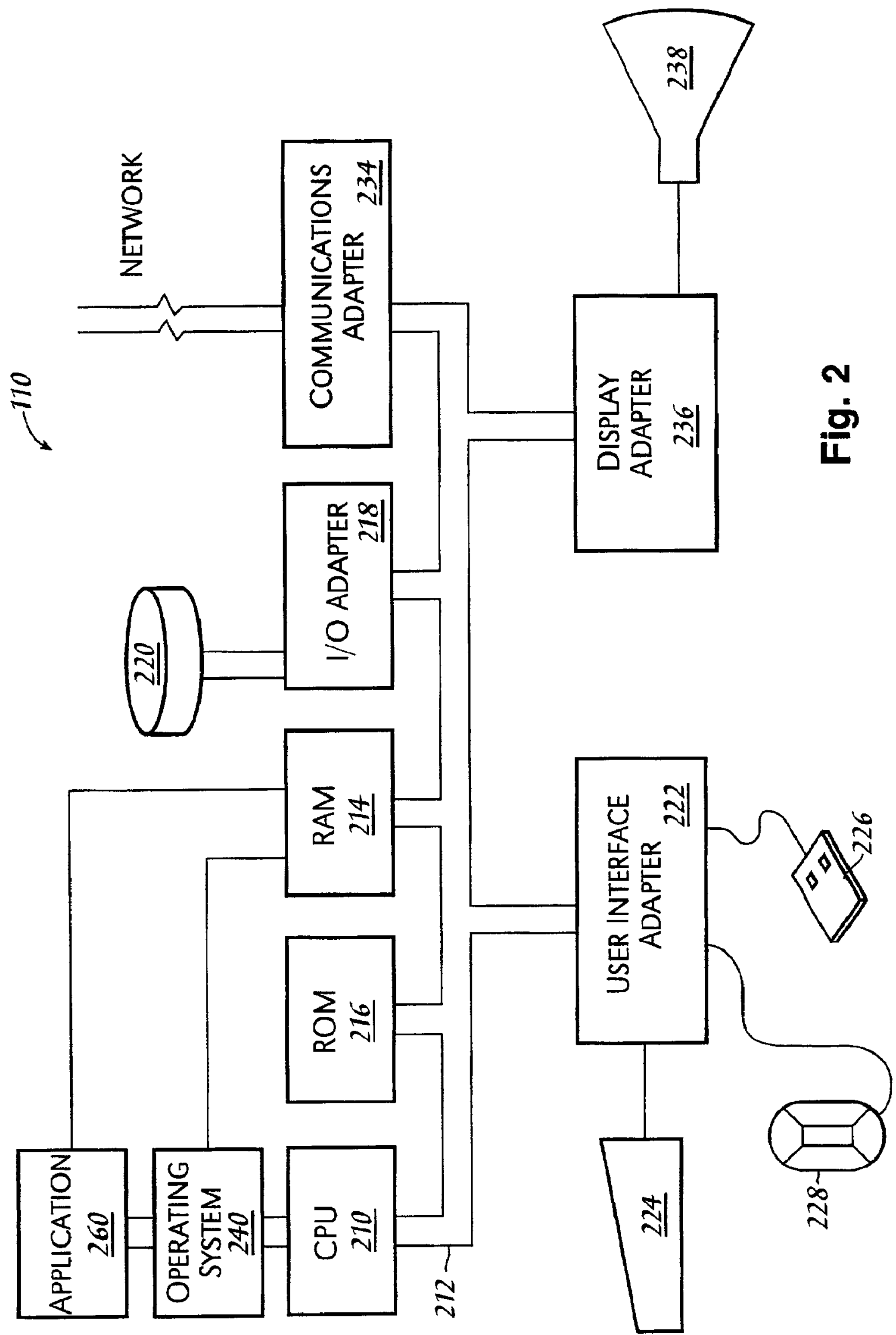
FIG. 2 illustrates an embodiment of the present invention of a client in a web based resource distribution system.

Refer now to FIG. 2 which is a high level illustration of a typical hardware configuration of server 110 which is representative of a hardware environment for practicing the present invention. Server 110 has a central processing unit (CPU) 210, such as a conventional microprocessor, coupled to various other components by system bus 212. An operating system 240 runs on CPU 210 and provides control and coordinates the function of the various components of FIG. 2. Application 260, e.g., web page engine 111, runs in conjunction with operating system 240 and provides output calls to operating system 240 which implements the various functions to be performed by the application 260. Read only memory (ROM) 216 is coupled to system bus 212 and includes a basic input/output system ("BIOS") that controls certain basic functions of server 110. Random access memory (RAM) 214, I/O adapter 218, and communications adapter 234 are also coupled to system bus 212. It should be noted that software components including operating system 240 and application 260 are loaded into RAM 214 which is the computer system's main memory. I/O adapter 218 may be a peripheral component interface ("PCI") adapter that communicates with disk units 220. Communications adapter 234 interconnects bus 212 with the Intranet or Internet enabling server 110 to communicate with client 120. Input/Output devices may also be connected to system bus 212 via a user interface adapter 222 and a display adapter 236. Keyboard 224, trackball 228, and mouse 226 are all interconnected to bus 212 through user interface adapter 222. Event data may be input to server 110 through any of these devices. Alternatively, as would be understood by those of ordinary skill in the art, that I/O data to be communicated between server 110 and a user, typically, a system operator or administrator, may be intermediated by a second data processing system with a similar hardware configuration as in FIG. 2, which may serve to communicate control information to a multiplicity of servers a server farm. In such an embodiment of a server 110 in accordance with the principles of the present invention, user I/O devices such as display monitor 238, display adapter 236, keyboard 224, trackball 228 and mouse 226 may be omitted.

Implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Figure 3:
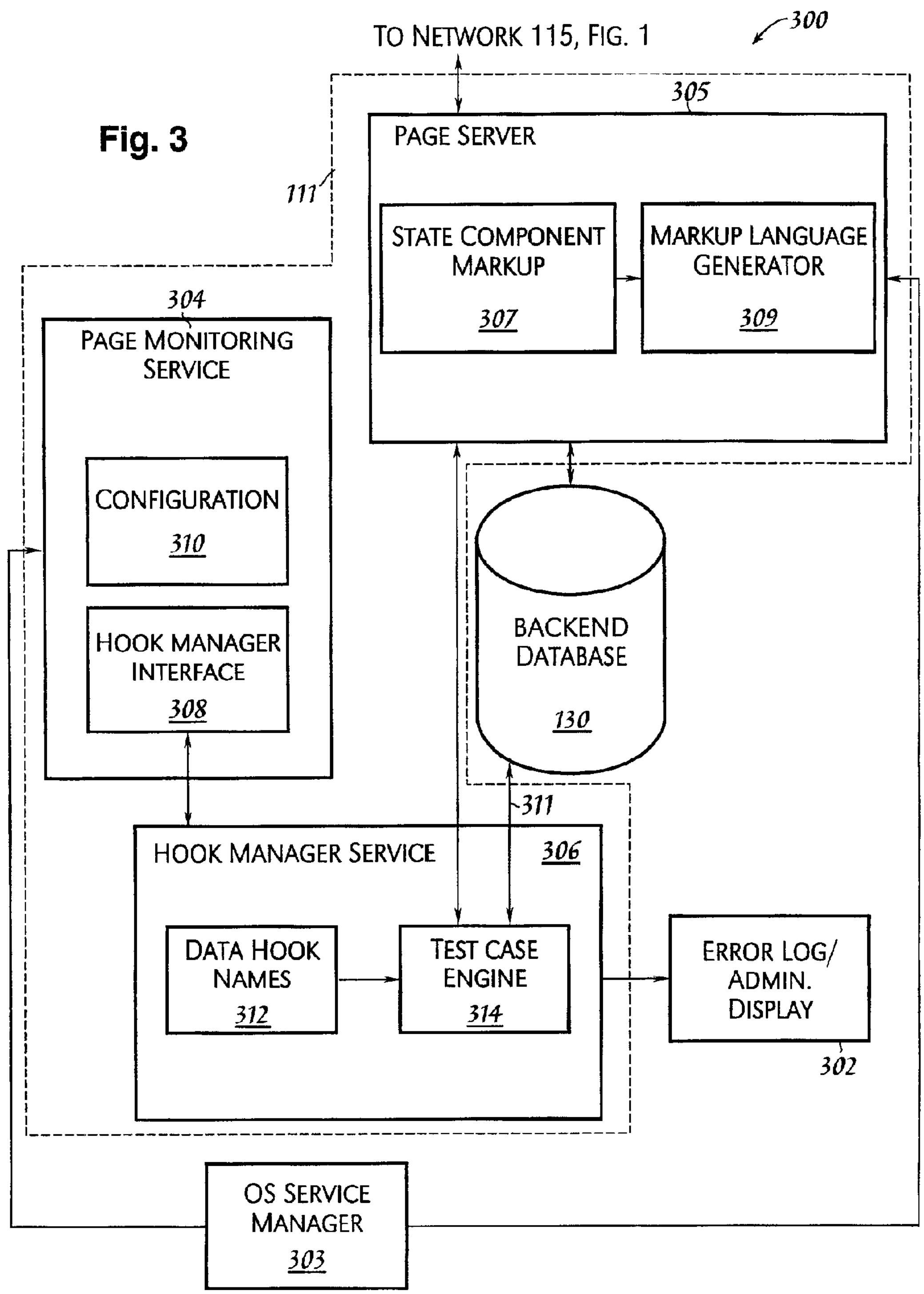
FIG. 3 illustrates, in block diagram form, a server architecture in accordance with an embodiment of the present invention.

Refer now to FIG. 3 which illustrates architecture 300 of web server 110 in further detail. Architecture 300 includes web page engine 111, database 130, and error log/administrator display 302. Note that in an embodiment of the present invention, administrator display 302 may correspond to display 238, FIG. 2. Architecture 300 also includes operating system (OS) services manager 303. OS services manager 303 starts and stops services, as well as locates services in distributed embodiments of web server 110. Web page engine 111 includes page server 305 configured to generate web pages in response to web client requests, and includes static components 307 and HTML generator 309 to generate dynamic components. Static components 307 may include embedded high level programming language statements, for example, Java, in a JSP embodiment. These statements may function to generate dynamic components of the web page. HTML generator 309 may generate dynamic components using compiled high level code, such as Java, in an embodiment employing JSP. On execution of the compiled code, the HTML for rendering the dynamic portions of the page, including portions responsive to client data, is generated. Page server 305 may be started by OS services manager 303 in response to a web page request, or alternatively to page monitor service 304.

Web page engine 111 further includes page monitor service 304 and a hook manager service 306. Page monitor service 304 and hook manager service 306 may be logical blocks for executing software that performs the process for the corresponding services, as described hereinbelow in conjunction with FIGS. 4 and 5. Page monitor service 304 may communicate with hook manager service 306 via hook manager interface 308.

Figure 4:
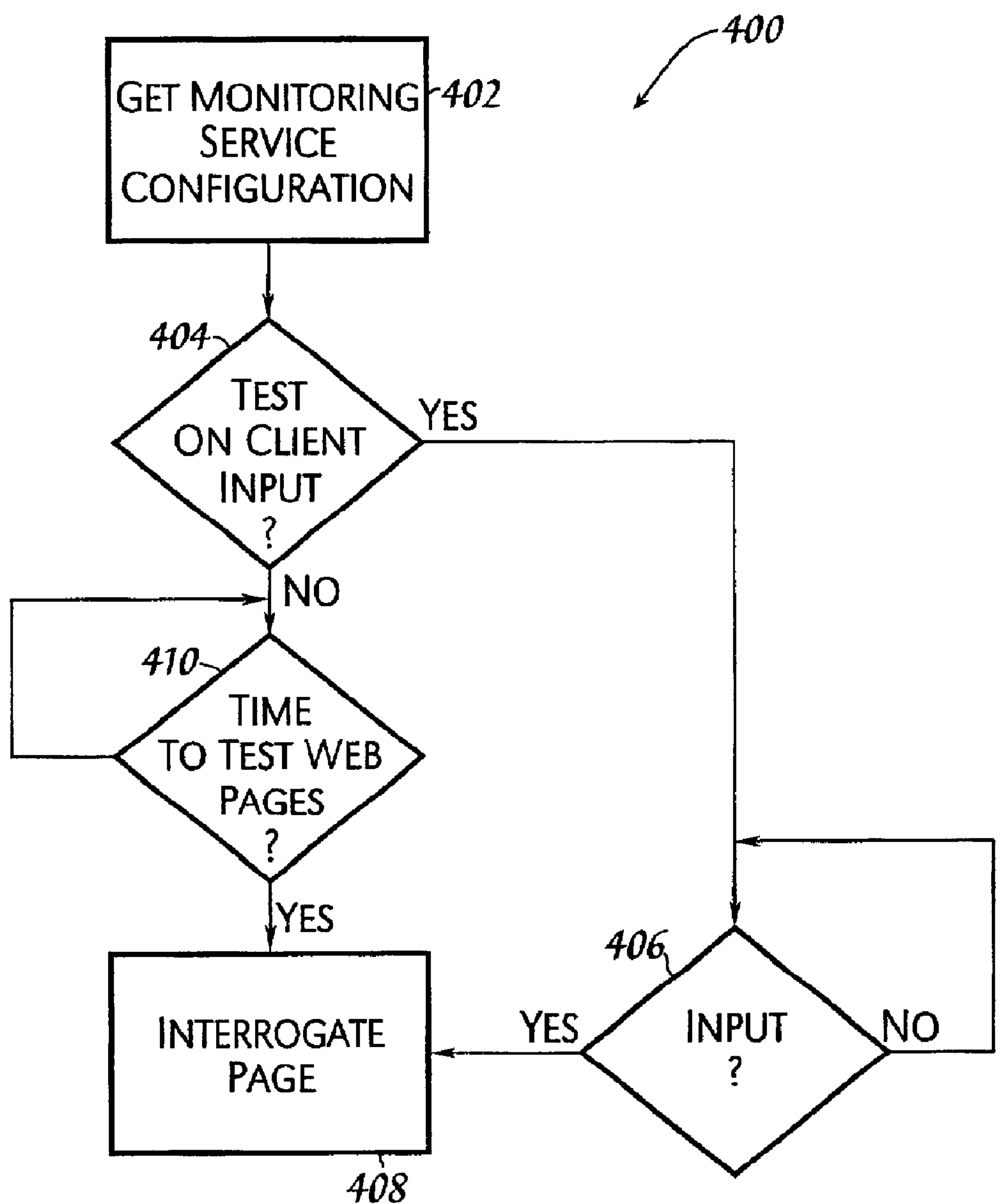
FIG. 4 illustrates, a high-level flow chart a methodology in accordance with the principles of the present invention.

The operation of OS service manager 303, page monitor service 304 and hook manager service 306 may be understood by referring now to FIG. 4, illustrating a high-level flow diagram of page monitor process 400 in accordance with the principles of the present invention.

Pages may be monitored using selectable modes of operation. One mode of page monitoring, may be recurrent monitoring at selected intervals of time. Another mode may be monitoring in response to input received in a page request from a web client. The mode, either recurring, or in response to web client input may be configured by a system administrator, as a value corresponding to the selected mode set in configuration registers 310 maintained by monitoring service 304 (FIG. 3).

In step 402, the monitor service configuration is retrieved, and in response thereto, it is determined, step 404, if testing on client input is to be performed. That is, the selected mode corresponds to page monitoring in response to input received in a request from a web client. If so, process 400 loops, in step 406, until input is received in a request. Upon receiving input from the requesting web client, the requested web page is interrogated, step 408. (Step 408 will be discussed in further detail in conjunction with FIG. 5.)

Returning to step 404, if testing on client input has not been selected, process 400 recurrently tests web pages. In step 410, it is determined if the selected time to test pages has occurred, for example if a selected time interval between the tests has elapsed. Note that the selected time for testing pages may be obtained from the service configuration information retrieved in step 402. If so, web pages are interrogated, step 408. Otherwise, process 400 loops in step 410 until the time to test web pages is reached. A typical interval at which pages are to be tested may be once every 24 hours, however those of ordinary skill in the art would recognize that other intervals may be used, and such embodiments would fall within the spirit and scope of the present invention.

Figure 5:
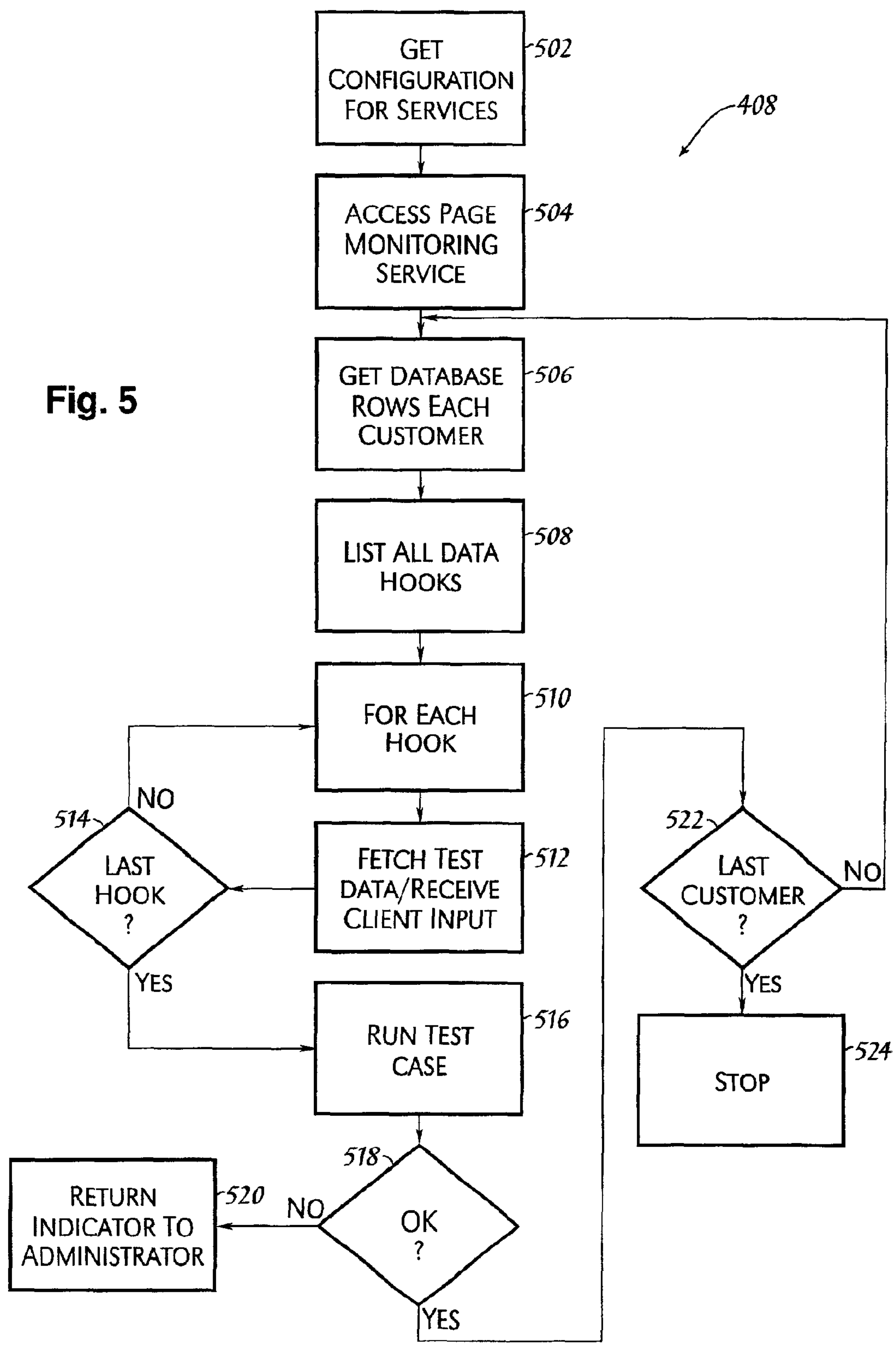
FIG. 5 illustrates in flow chart form, a portion of the methodology of FIG. 4 in further detail.

Refer now to FIG. 5, illustrating, in flowchart form step 408 in further detail. In step 502, the configuration for services is retrieved. The configuration may be kept in the default database for the system such as system configuration database 114 (FIG. 1). The configuration may contain the interval for testing, the daily time to start testing, current time and day, administrator user name and password, and address of server where pages are contained and address of database server. It would be recognized that the aforementioned are exemplary alternative embodiments and may include other configuration information, and such alternative embodiments would be within the spirit and scope of the present invention. In step 504, the page monitoring service, such as page monitoring service 304, FIG. 3, is accessed. (Steps 502 and 504 may be performed by OS services 303.) In step 506, database rows for each customer, that is, each web client having access to the web server, such as web server 110, FIG. 1 are retrieved. (Note that security restrictions may limit access to certain web clients, depending on the requested transaction or web service.) If the page monitoring is being performed in response to a web client input, as discussed herein above in conjunction with FIG. 4, the database rows accessed are for that particular customer. If, page monitoring is being done recurrently to detect errors in the database information, then step 408 loops over the customers authorized to access the web services, steps 508–522, described hereinbelow.

In step 508, all data hooks are listed. Hooks are alternative entries into the methods that generate the dynamic elements of the web pages. As previously described, the dynamic portions of the web page may be generated by software code written in a high level language, for example, Java in the case of JSPs. These methods produce HTML that, when executed by the web client's browser, renders the dynamic portions of the page, in response to the dynamic data passed to the methods. Hooks provide an alternative entry into the methods whereby the methods may be executed to verify the integrity of the data with respect to the methods, without sending the web page to the web client. The methods implement actions applied to the data, which actions are required to complete a particular transaction that may be requested by a web client customer. Thus, associated with the data are one or more hooks into the methods which implement the actions to be taken on the data. Thus, for each piece of data, there are corresponding lists of hooks. Steps 506 and 508 may be performed by monitoring service 304 and hook manager service 306, in an embodiment in accordance with architecture 300 of FIG. 3. Referring to FIG. 3, monitoring service 304 may communicate with hook manager service 306 via interface 308. Hook manager service 306 may maintain a data structure of data hook names 312, which may be understood as a matrix of data and corresponding hooks associated with that data, for all of the data elements that are required by the web server to respond to a requested transaction. Hook manager service 306 may be recognized by the backend database as a trusted agent that can interact with the page server, such as page server 305, and database 130. Hook manager 306 may access database 130 via a secured path 311 between database 130 and test case engine 314.

In step 510, a loop over hooks is entered, and in step 512 the test data is fetched from the database or, alternatively if the pages being monitored in response to client input, the client input is received. In step 514, for each hook, the corresponding data is fetched until all data has been obtained from the database, or received from client. When the data is retrieved for all hooks, the test case is run in step 516. In an embodiment of the present invention in accordance with architecture 300, FIG. 3, the test case may be run by test case engine 314 (FIG. 3) by passing the retrieved data to the page via the hooks corresponding therewith. The methods associated with each hook may return a code, for example "TRUE" if the method executed successfully with the data under test, or alternatively, "FALSE" if the action on the data failed. Alternatively, in a Java implementation, the method may throw an exception in the later case. If the data under test failed, step 518 proceeds by the "No" branch and an indicator is returned to the administrator, step 520. The indicator may include the data that failed. Thus, for example, if the web page corresponded to a finds transfer requested by the web client between financial institution accounts, an account number error, might be detected before the web client was presented with a page error.

If, however, in step 518, the test case completed satisfactorily, step 408 then loops over customers, by determining, in step 522 if all customers' data had been tested. If not, step 408 returns to step 506 to test the data for the next customer. Otherwise, the process terminates step 524. Note that if the page is being monitored in response to user input, as discussed hereinabove in conjunction with FIG. 4, the corresponding web client customer will also represent the last customer, in step 522, and step 522 will exit through the "Yes" branch.

Although the system and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A process for monitoring web pages comprising the steps of:

selectively interrogating a web page in response to a preselected mode, wherein said web page includes at least one portion dynamically generated in response to client data;

said step of selectively interrogating said web page including the steps of:

listing a set of hooks corresponding to at least a portion of said client data, wherein each hook of said set of hooks comprises an alternative entry of a method for performing an action on said client data; and passing said at least a portion of said client data to corresponding methods using hooks in said set of hooks and wherein a web page is not returned to a client in response to said step of passing said at least a portion of said client data.

2. The process of claim 1 further comprising the step of determining said preselected mode in response to a configuration value.

3. The process of claim 1 wherein said step of interrogating said web page further comprises the step of detecting a web page error in response to said step of passing said at least a portion of said data values.

4. The process of claim 3 wherein said step of detecting said web page error comprises the step of receiving a predetermined return value from at least one of said corresponding methods, said predetermined return value indicating a failure of said at least one of said corresponding methods.

5. The process of claim 3 wherein said step of detecting said web page error comprises detecting an exception thrown by said at least one of said corresponding methods.

6. The process of claim 1 wherein said step of interrogating said web page further comprises the step of executing said corresponding methods in response to said step of said at least a portion of said client data.

7. The process of claim 6 wherein said corresponding methods comprise methods written in the Java programming language, and wherein said web page comprises a Java Server Page (JSP).

8. The process of claim 4 further comprising the step of providing an indicator in response to said step of detecting said web page error, said indicator including one or more erroneous data values generating said web page error.

9. The process of claim 1 wherein said preselected mode comprises monitoring said web page in response to input received from a web client.

10. The process of claim 1 wherein said preselected mode comprises recurrently monitoring said web page, and wherein said client data is retrieved from a database.

11. A data processing system for monitoring web pages comprising:

circuitry operable for selectively interrogating a web page in response to a preselected mode, wherein said web page includes at least one portion dynamically generated in response to client data;

said circuitry operable for selectively interrogating said web page including:

circuitry operable for listing a set of hooks corresponding to at least a portion of said client data, wherein each hook of said set of hooks comprises an alternative entry of a method for performing an action on said client data; and circuitry operable for passing, using hooks in said set of hooks, said at least a portion of said client data to corresponding methods and wherein a web page is not returned to a client in response to said step of passing said at least a portion of said client data.

12. The system of claim 11 wherein said process further comprises the step of determining said preselected mode in response to a configuration value.

13. The system of claim 11 wherein said circuitry operable for interrogating said web page further comprises circuitry operable for detecting a web page error in response to said step of passing said at least a portion of said data values.

14. The system of claim 13 wherein said circuitry operable for detecting said web page error comprises circuitry operable for receiving a predetermined return value from at least one of said corresponding methods, said predetermined return value indicating a failure of said at least one of said corresponding methods.

15. The system of claim 13 wherein circuitry operable for detecting said web page error comprises detecting an exception thrown by said at least one of said corresponding methods.

16. The system of claim 11 wherein said circuitry operable for interrogating said web page further comprises circuitry operable for executing said corresponding methods in response to said step of said at least a portion of said client data.

17. The system of claim 16 wherein said corresponding methods comprise methods written in the Java programming language, and wherein said web page comprises a Java Server Page (JSP).

18. The system of claim 14 further comprising circuitry operable for providing an indicator in response to said step of detecting said web page error, said indicator including one or more erroneous data values generating said web page error.

19. The system of claim 11 wherein said preselected mode comprises monitoring said web page in response to input received from a web client.

20. The system of claim 11 wherein said preselected mode comprises recurrently monitoring said web page, and wherein said client data is retrieved from a database.

21. A computer program product embodied in a tangible storage medium, the program for monitoring web pages comprising a program of instructions for performing the process steps of:

selectively interrogating a web page in response to a preselected mode, wherein said web page includes at least one portion dynamically generated in response to client data;

said step of selectively interrogating said web page including the steps of:

listing a set of hooks corresponding to at least a portion of said client data, wherein each hook of said set of hooks comprises an alternative entry of a method for performing an action on said client data; and passing, using hooks in said set of hooks, said at least a portion of said client data to corresponding methods and wherein a web page is not returned to a client in response to said step of passing said at least a portion of said client data.

22. The program product of claim 21 further comprising programming instructions for performing the step of determining said preselected mode in response to a configuration value.

23. The program product of claim 21 wherein said programming instructions for performing the step of interrogating said web page further comprises programming instructions for performing the step of detecting a web page error in response to said step of passing said at least a portion of said data values.

24. The program product of claim 23 wherein said programming instructions for performing the step of detecting said web page error comprises programming instructions for performing the step of receiving a predetermined return value from at least one of said corresponding methods, said predetermined return value indicating a failure of said at least one of said corresponding methods.

25. The program product of claim 23 wherein said programming instructions for performing the step of detecting said web page error comprises programming instructions for performing the step of detecting an exception thrown by said at least one of said corresponding methods.

26. The program product of claim 21 wherein said programming instructions for performing the step of interrogating said web page further comprises programming instructions for performing the step of executing said corresponding methods in response to said step of said at least a portion of said client data.

27. The program product of claim 26 wherein said corresponding methods comprise methods written in the Java programming language, and wherein said web page comprises a Java Server Page (JSP).

28. The program product of claim 24 further comprising programming instructions for performing the step of providing an indicator in response to said programming instructions for performing the step of detecting said web page error, said indicator including one or more erroneous data values generating said web page error.

29. The program product of claim 21 wherein said preselected mode comprises monitoring said web page in response to input received from a web client.

30. The program product of claim 21 wherein said preselected mode comprises recurrently monitoring said web page, and wherein said client data is retrieved from a database.

* * * * *